US010492359B2

(12) United States Patent
Borkgren et al.

(10) Patent No.: US 10,492,359 B2
(45) Date of Patent: Dec. 3, 2019

(54) SEEDING SYSTEM

(71) Applicant: Deere & Company, Moline, IL (US)

(72) Inventors: Stanley R. Borkgren, Geneseo, IL (US); William D. Graham, Moline, IL (US); Terry L. Snipes, East Moline, IL (US); Elijah B. Garner, Bettendorf, IA (US); Robert T. Casper, Davenport, IA (US); Scott C. McCartney, Bettendorf, IA (US); Michael E. Frasier, Iowa City, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 15/290,345

(22) Filed: Oct. 11, 2016

(65) Prior Publication Data

US 2017/0086355 A1    Mar. 30, 2017

Related U.S. Application Data

(63) Continuation-in-part of application No. 14/871,653, filed on Sep. 30, 2015, now Pat. No. 9,814,173.

(51) Int. Cl.
*A01C 7/08*    (2006.01)
*A01C 7/20*    (2006.01)
(Continued)

(52) U.S. Cl.
CPC .............. *A01C 15/006* (2013.01); *A01C 7/06* (2013.01); *A01C 7/08* (2013.01); *A01C 7/081* (2013.01);
(Continued)

(58) Field of Classification Search
CPC ......... A01C 7/081; A01C 7/082; A01C 7/084; A01C 7/06; A01C 15/006; A01C 7/102;
(Continued)

(56) References Cited

U.S. PATENT DOCUMENTS 4,638,748 A    1/1987 Kopecky
4,779,765 A    10/1988 Neumeyer
(Continued)

FOREIGN PATENT DOCUMENTS

CA    2741267 A1 *  11/2012  ............. A01C 7/082
DE    8416161 U1    9/1985
(Continued)

OTHER PUBLICATIONS

Office Action from the US Patent and Trademark Office for U.S. Appl. No. 14/871,515 dated Oct. 24, 2017 (13 pages).
(Continued)

*Primary Examiner* — Alicia Torres
(74) *Attorney, Agent, or Firm* — Michael Best & Friedrich LLP

(57) ABSTRACT

A product distribution system includes a product on demand pick-up assembly including a hopper. The hopper is configured such that an air stream flowing into the pick-up assembly entrains product therein and conveys product downstream through a plurality of conduits. The product distribution system further includes a container for storing product prior to delivery of product to the pick-up assembly and a meter and conveyor assembly configured to move product from the container to the pick-up assembly hopper such that an amount of product greater than a predetermined quantity is maintained in the pick-up assembly hopper during operation of the system.

15 Claims, 15 Drawing Sheets

(51) Int. Cl.
*A01C 15/04* (2006.01)
*A01C 15/00* (2006.01)
*A01C 7/06* (2006.01)
*B65G 53/04* (2006.01)
*A01C 7/10* (2006.01)

(52) U.S. Cl.
CPC .............. *A01C 7/082* (2013.01); *A01C 7/084* (2013.01); *B65G 53/04* (2013.01); *A01C 7/102* (2013.01); *A01C 15/04* (2013.01)

(58) Field of Classification Search
CPC ........ A01C 7/105; B65G 53/04; B65G 53/06; B65G 53/16
See application file for complete search history.

(56) References Cited

U.S. PATENT DOCUMENTS

| | | | | |
|---|---|---|---|---|
| 4,793,742 | A * | 12/1988 | Strand | A01C 15/04 222/272 |
| 5,351,635 | A | 10/1994 | Hulicsko | |
| 5,650,609 | A | 7/1997 | Mertins | |
| 5,826,523 | A | 10/1998 | Gregor | |
| 6,192,813 | B1 | 2/2001 | Memory et al. | |
| 6,213,690 | B1 | 4/2001 | Gregor et al. | |
| 6,283,679 | B1 | 9/2001 | Gregor et al. | |
| 6,688,244 | B1 | 2/2004 | Meyer et al. | |
| 6,935,255 | B2 | 8/2005 | Hagen et al. | |
| 7,353,760 | B2 | 4/2008 | Mayerle et al. | |
| 7,509,915 | B2 | 3/2009 | Memory | |
| 7,555,990 | B2 | 7/2009 | Beaujot | |
| 7,743,719 | B2 * | 6/2010 | Memory | A01C 7/088 111/175 |
| 7,765,943 | B2 | 8/2010 | Landphair | |
| 7,938,075 | B1 | 5/2011 | Glendenning et al. | |
| 8,132,521 | B2 | 3/2012 | Snipes et al. | |
| 8,281,724 | B2 | 10/2012 | Snipes | |
| 8,350,689 | B2 | 1/2013 | Mariman et al. | |
| 8,666,608 | B2 * | 3/2014 | Friggstad | A01B 79/005 111/173 |
| 9,043,949 | B2 | 6/2015 | Liu et al. | |
| 9,488,512 | B2 | 11/2016 | Hossain et al. | |
| 9,596,803 | B2 | 3/2017 | Wendte et al. | |
| 9,699,953 | B2 | 7/2017 | Jagow et al. | |
| 2003/0133759 | A1 | 7/2003 | Winther | |
| 2007/0266917 | A1 | 11/2007 | Riewerts et al. | |
| 2009/0079624 | A1 | 3/2009 | Dean et al. | |
| 2012/0226461 | A1 | 9/2012 | Kowalchuk | |
| 2014/0165890 | A1 | 6/2014 | Graham | |
| 2014/0216314 | A1 | 8/2014 | Bourgault et al. | |
| 2014/0311598 | A1 | 10/2014 | Hui et al. | |
| 2015/0090166 | A1 | 4/2015 | Allgaier et al. | |
| 2015/0223392 | A1 | 8/2015 | Wilhelmi et al. | |
| 2016/0037713 | A1 | 2/2016 | Wendte et al. | |
| 2016/0088791 | A1 * | 3/2016 | Horsch | A01C 7/102 111/149 |
| 2016/0095274 | A1 | 4/2016 | Wendte et al. | |
| 2016/0120107 | A1 | 5/2016 | Chahley et al. | |
| 2016/0121284 | A1 | 5/2016 | Roberge et al. | |
| 2016/0135359 | A1 | 5/2016 | Kowalchuk et al. | |
| 2016/0157417 | A1 | 6/2016 | Funck | |
| 2016/0234996 | A1 | 8/2016 | Sauder et al. | |
| 2016/0295792 | A1 | 10/2016 | Secrest et al. | |
| 2016/0302353 | A1 | 10/2016 | Wendte et al. | |
| 2017/0086351 | A1 | 3/2017 | Garner et al. | |
| 2017/0086352 | A1 | 3/2017 | Frasier et al. | |
| 2017/0086356 | A1 | 3/2017 | Schweitzer et al. | |
| 2017/0127605 | A1 * | 5/2017 | Roberge | A01C 7/082 |
| 2017/0156259 | A1 * | 6/2017 | Barsi | A01C 7/082 |

FOREIGN PATENT DOCUMENTS

| | | | | |
|---|---|---|---|---|
| EP | 1591000 | A1 | 11/2005 | |
| EP | 2196079 | | 6/2010 | |
| EP | 2765398 | | 8/2014 | |
| EP | 3000299 | | 3/2016 | |
| EP | 3235361 | A1 * | 10/2017 | A01C 7/081 |
| FR | 2973790 | | 10/2012 | |
| SU | CCCP 759063 | * | 3/1979 | |
| WO | 2015094108 | | 6/2015 | |

OTHER PUBLICATIONS

EP16190733.2 Extended European Search Report dated Feb. 2, 2017 (9 pages).
Office Action from the US Patent and Trademark Office for U.S. Appl. No. 14/871,515 dated Jan. 27, 2017 (13 pages).
Office Action from the US Patent and Trademark Office for U.S. Appl. No. 14/871,633 dated Jan. 19, 2017 (13 pages).
Office Action from the US Patent and Trademark Office for U.S. Appl. No. 14/871,653 dated Jan. 31, 2017 (13 pages).
Office Action from the US Patent and Trademark Office for U.S. Appl. No. 14/871,515 dated May 10, 2017 (5 pages).
Office Action from the US Patent and Trademark Office for U.S. Appl. No. 14/871,633 dated Jul. 6, 2017 (14 pages).
Office Action from the US Patent and Trademark Office for U.S. Appl. No. 14/871,653 dated Jul. 17, 2017 (5 pages).
German Patent Office Search Report for Application No. 102017216623.1 dated Aug. 29, 2018 (11 pages, statement of relevance included).
German Patent Office Search Report for Application No. 102016218258.7 dated Apr. 24, 2019 (11 pages, statement of relevance included).

* cited by examiner

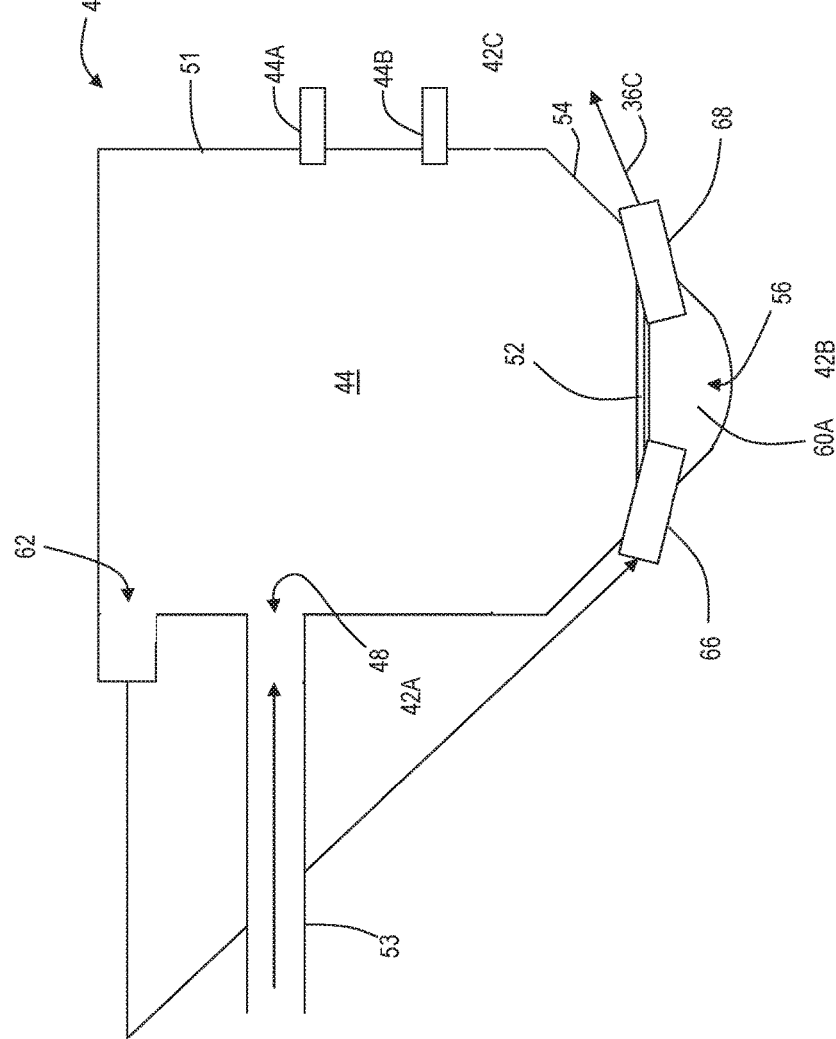

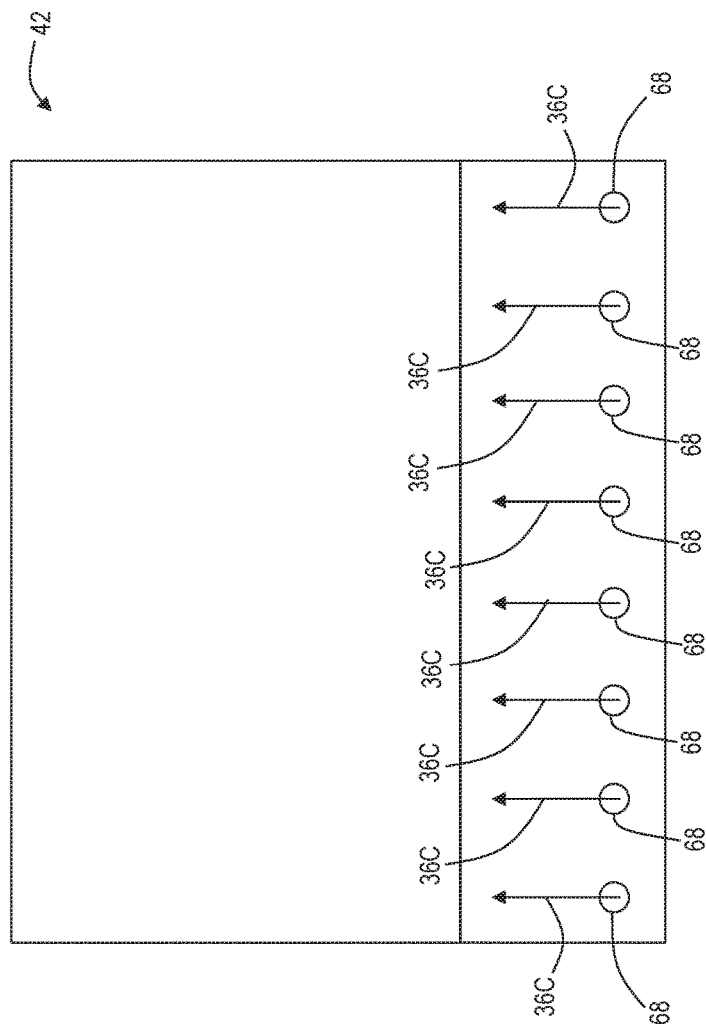

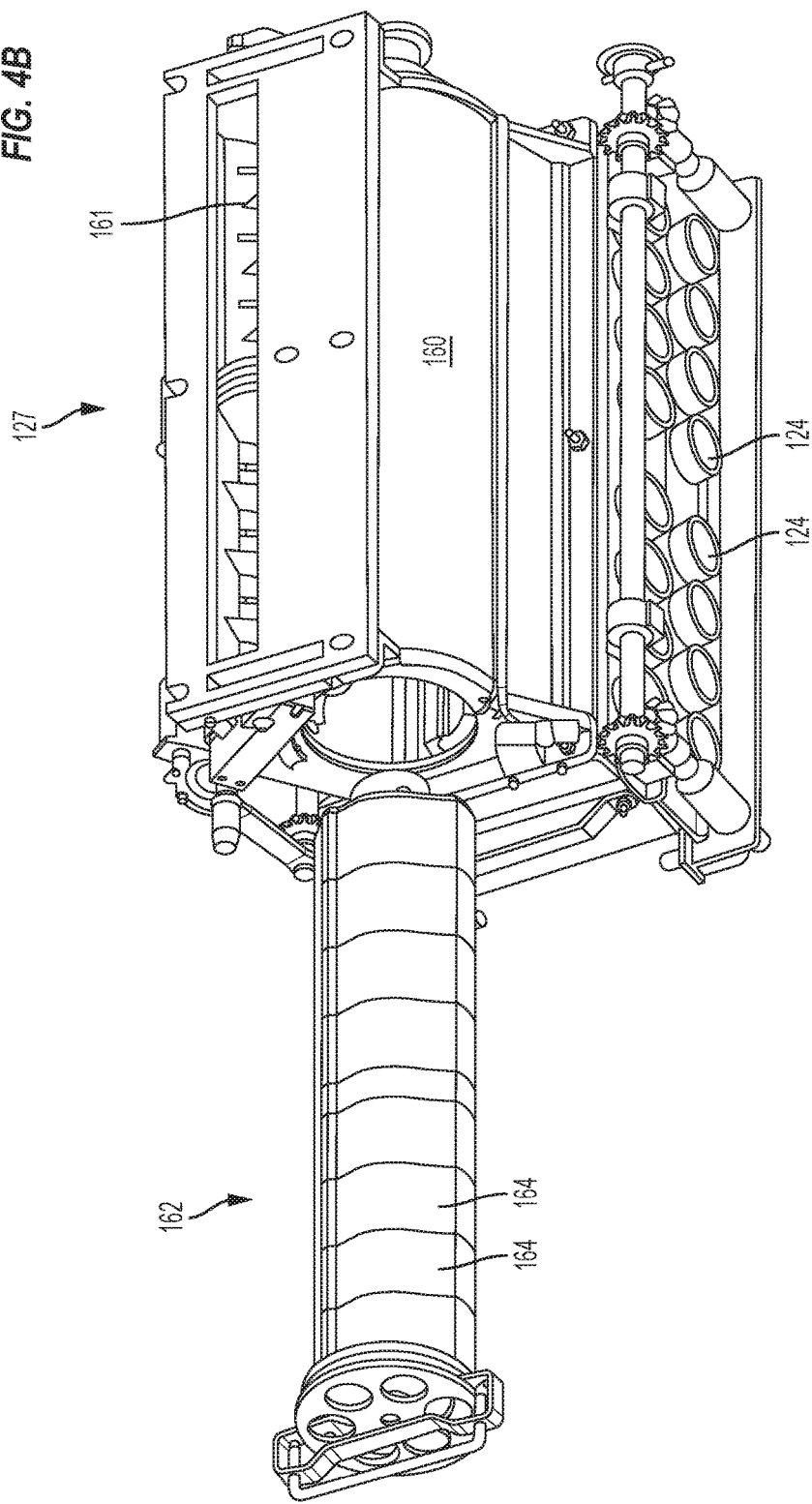

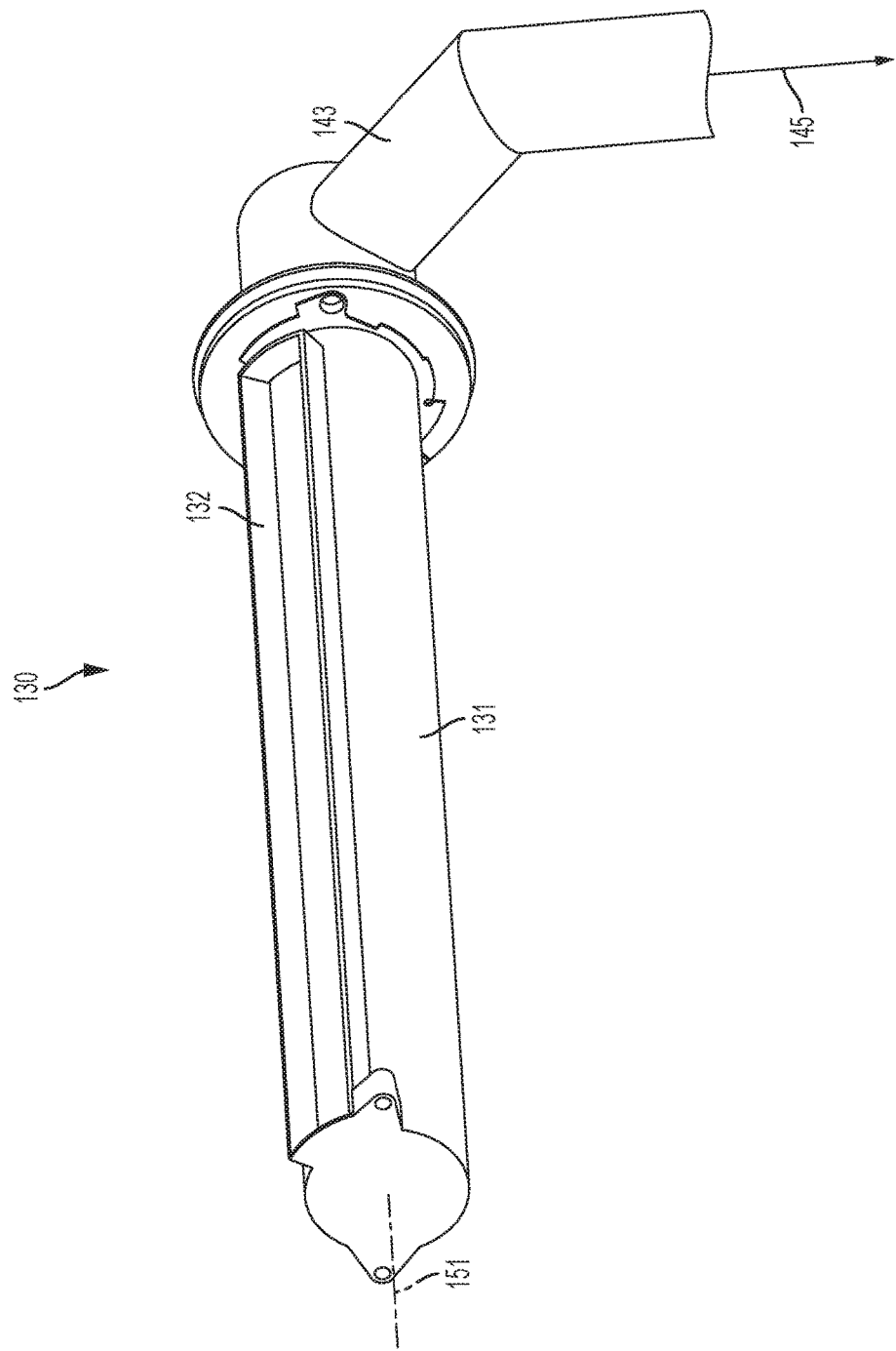

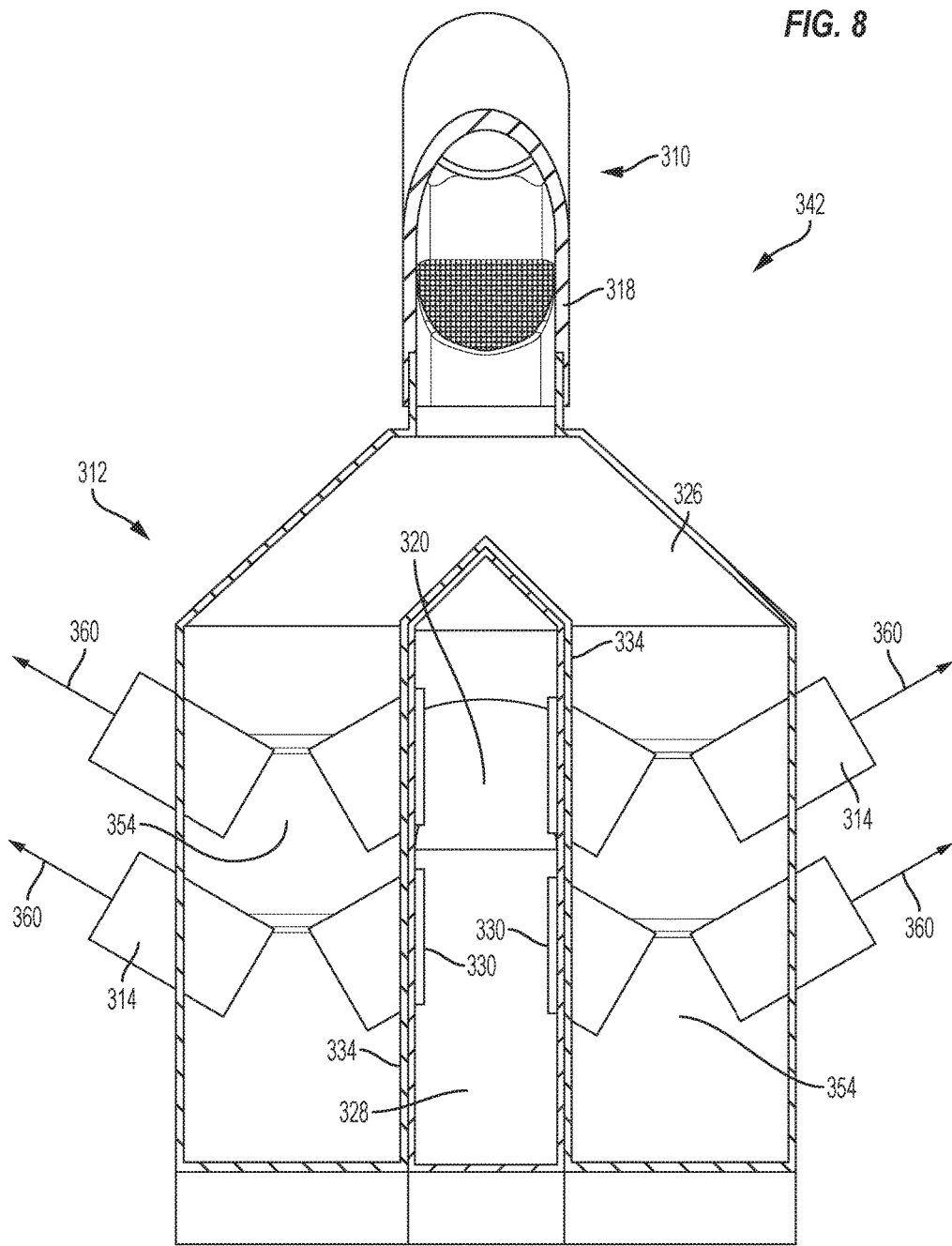

SEEDING SYSTEM

CROSS-REFERENCE TO RELATED APPLICATIONS

This application is a continuation-in-part of U.S. patent application Ser. No. 14/871,653 filed Sep. 30, 2015, the entire contents of which are incorporated by reference.

BACKGROUND

The present disclosure relates to a seeding and planting system and more particularly to a metering and distribution system of the seeding and planting system.

SUMMARY

Current seeding practices tend to involve one of two types of seeding systems: planters and air seeders. Planters generally singulate or individually meter seeds prior to planting and are typically used to disperse seeds where precise placement is required for maximum yield and the seeding rate permits use of singulating technologies. Air seeders generally meter seeds volumetrically and are typically used in high rate seeding applications and where precise seed placement is of less importance or not practical due to the high rates.

A product distribution system includes a product on demand pick-up assembly including a hopper. The hopper is configured such that an air stream flowing into the pick-up assembly entrains product therein and conveys product downstream through a plurality of conduits. The product distribution system further includes a container for storing product prior to delivery of product to the pick-up assembly and a meter and conveyor assembly configured to move product from the container to the pick-up assembly hopper such that an amount of product greater than a predetermined quantity is maintained in the pick-up assembly hopper during operation of the system.

A product on demand nozzle assembly includes an array of vertically spaced nozzles, each nozzle having an air inlet, an air and entrained product outlet, and an entrainment zone there between which is open from above to receive product therein to be distributed.

A distribution system comprises a product on demand pick-up assembly including a hopper, the hopper configured such that an air stream flowing into the product on demand pick-up assembly entrains product therein and conveys product downstream through a plurality of conduits. Each tower of a plurality of pneumatic distribution towers is located downstream of an associated conduit of the plurality of conduits, and each pneumatic distribution tower includes an inlet extending upwards to a plurality of radially spaced outlets.

Other features and aspects of the disclosure will become apparent by consideration of the following detailed description and accompanying drawings.

BRIEF DESCRIPTION OF THE DRAWINGS

FIG. 3A is an enlarged view of a distribution unit including a seed channel, as shown in FIG. 2.

FIG. 3B is a side view of the third distribution unit showing multiple seed conduit outlets.

FIG. 4B is a perspective view of a volumetric meter assembly.

FIG. 4C is a perspective view of an auger, associated with one of the plurality of tanks.

FIG. 8 is a cross-sectional side view of the distribution unit of FIG. 7.

Before any embodiments of the disclosure are explained in detail, it is to be understood that the disclosure is not limited in its application to the details of construction and the arrangement of components set forth in the following description or illustrated in the following drawings. The disclosure is capable of supporting other embodiments and of being practiced or of being carried out in various ways. Also, it is to be understood that the phraseology and terminology used herein is for the purpose of description and should not be regarded as limiting.

DETAILED DESCRIPTION

Figure 1:
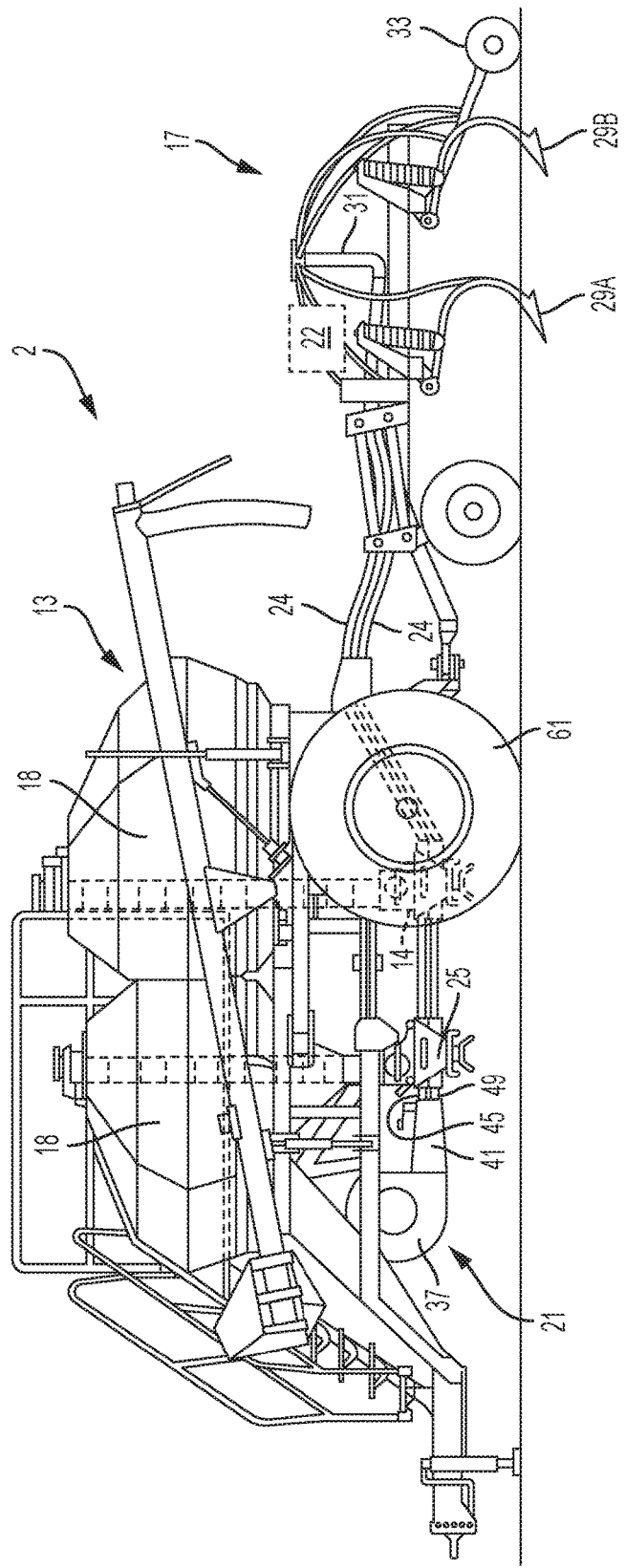
FIG. 1 is a side view of a seeder.

As shown in FIG. 1, seeding machine 2 comprises a seed cart 13 and a tilling implement 17. The seed cart 13 is typically towed by a tractor through a field to be seeded. The seed cart 13 has a frame supporting a number of storage tanks 18 with wheels 61 rotatably mounted to the frame. The product contained in the storage tanks 18 may include seed, fertilizer, or other agricultural particles. Each storage tank 18 is provided with a volumetric meter 14. Each volumetric meter 14 is positioned below the respective storage tank 18 and receives product therefrom for controlled feeding of the product into a pneumatic distribution system 21.

Figure 2:
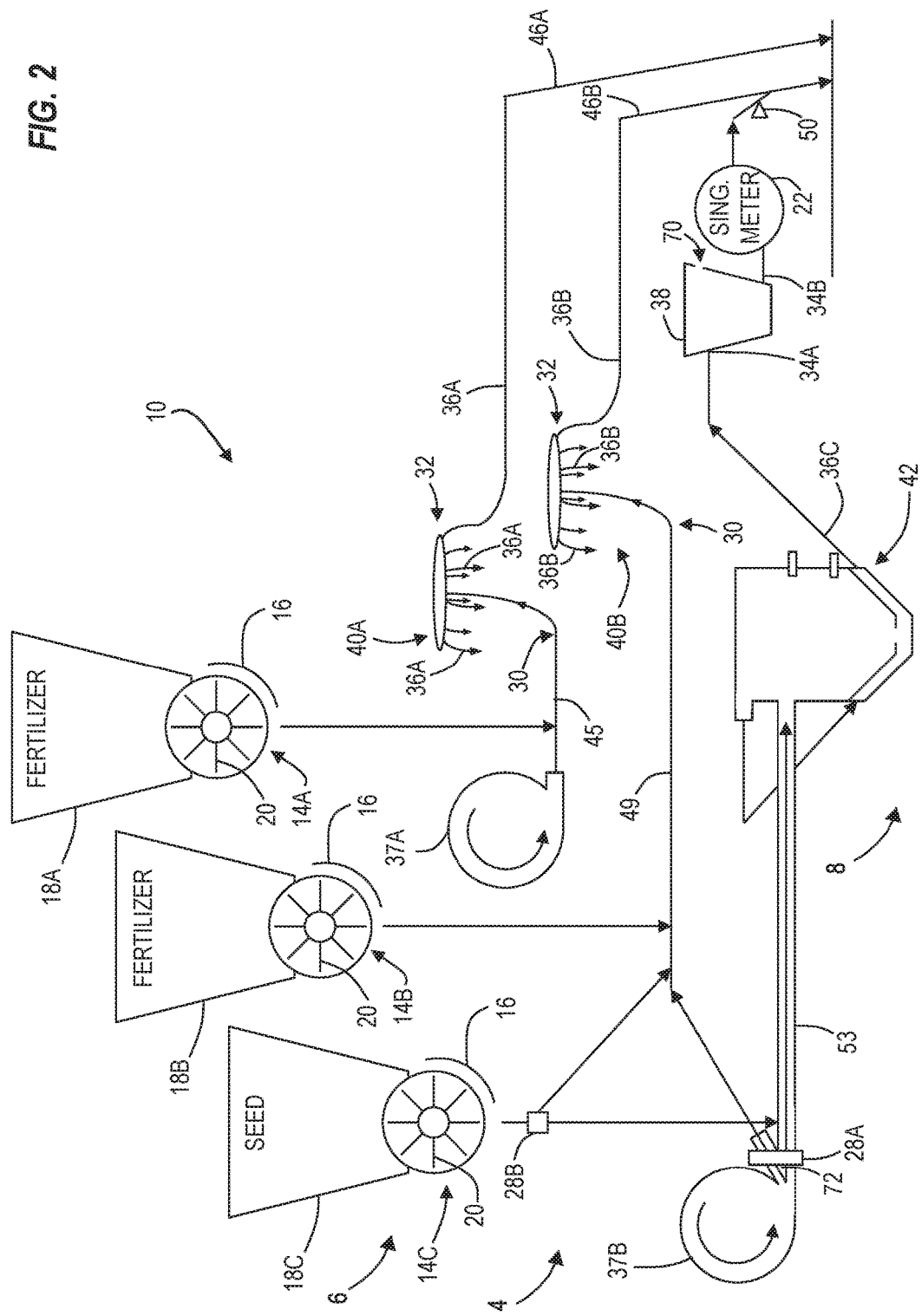
FIG. 2 is a schematic diagram illustrating a metering and distribution system.

The tilling implement 17, towed behind the seed cart 13, comprises a frame to which ground openers 29A, 29B are mounted. The tilling implement 17 may also include seed row finishing equipment such as packers 33. Located below each volumetric meter 14 is a primary air distribution manifold 25, part of the pneumatic distribution system 21. The pneumatic distribution system 21 distributes metered product from the storage tanks 18 to the ground openers 29A, 29B and comprises a blower 37 driven by a motor which directs a stream of pressurized air through an adjustable damper 41, which thereafter directs the air stream into a top rank portion directed into an upper rank of first tubes 45 and a bottom rank portion directed into a bottom rank of first tubes 49. FIG. 1 illustrates a double shoot air seeder wherein a first product contained in one of the containers or storage tanks 18 is directed to the top rank portion 45 of the air stream and the second product contained in the other of the storage tanks 18 is directed to the bottom rank portion 49 of the air stream. Triple shot applications in which three products are added to three different rank portions of the air stream are also utilized in certain situations, as shown in FIG. 2. Alternatively, the distribution manifolds 25 may be configured to deliver product from both tanks 18 into the same rank portion of the pneumatic distribution system for delivery of the two products together to the same location in the soil. In the seeding machine 2, each of the upper and bottom rank portions have eight primary tubes 24. Each primary tube directs product to a dispersion unit or distribution tower 31 on the tool 17 where the product stream is divided into multiple conduits each directed to a ground opener 29A-29B. The machine 2 employs a volumetric metering system using the volumetric meters 14 to meter product delivered to the soil.

FIG. 2 schematically illustrates a product distribution or seed metering system 10 along three rank portions or main conduits 45, 49, 53 for use in a planting operation, such as seeding a field or dispersing agricultural particles (e.g., fertilizer, etc.). The seed metering system 10 can be used with or as a part of the seeding machine 2.

Tank 18A has a volumetric meter 20 at the lower end thereof for controlled feeding of the product into a pneumatic distribution system through a manifold, such as manifold 25 of FIG. 1. Product is delivered to the conduit 45 where an air stream from a fan 37A pneumatically conveys the product. Product is directed to a distribution tower or dispersion unit 40A, where the product air stream is divided into multiple secondary conduits 36A to outlet conduits 46A each leading to a ground opener, such as the openers 29A, 29B of FIG. 1 for depositing the product into the ground. Similarly, tank 18B has a meter 14B at the lower end thereof controlling the flow of product to the conduit 49 where product is conveyed by air from a second fan 37B. Alternatively, a single fan may be used if desired. Product is conveyed through conduit 49 to a dispersion unit 40B or distribution tower where it is divided into secondary conduits 36B and directed to the soil. The tanks 18A, 18B and associated distribution systems are similar to FIG. 1 in that product is volumetrically metered and delivered to the ground. Tanks 18A, 18B are typically used for fertilizer or other chemicals. Each volumetric meter 14 is constructed of a plurality of meter roller segments 20 driven by a common drive shaft extending into the paper of FIG. 2. Gates 16 associated with each volumetric meter 14A, 14B, 14C or each roller segment 20 are operable to open or close the meter outlet to start and stop the flow of product from the associated roller segment of the meter. This enables the operator to prevent overlapping in the application of product. Alternatively, each roller segment 20 of the volumetric meters 14A, 14B, 14C may be individually driven, and may be driven at varying speeds (including stopping the roller segment) to vary the amount of product discharged by each roller segment.

The tank 18C on the other hand is typically used for seed. Seed from the volumetric meter 14C at the lower end of tank 18C is directed by the control valve 28B to the conduit 49 for distribution through the dispersion unit 40B as described above for volumetrically metered seed. Alternatively, seed can be directed by the control valve 28B to the conduit 53 and ultimately to the singulating meter 22 where the seed is further metered, to singulate the seed and deliver individual seeds, one at a time, to the soil as described below. Seed is conveyed in the conduit 53 pneumatically by air from fan 37B to a dispersion unit 42, known as a product-on-demand pick-up assembly and from there to a mini-hopper 38 associated with a singulating meter 22. A meter and conveyor assembly 4 includes a mechanical conveyor system 6 and/or a pneumatic system 8. The mechanical conveyor system 6 includes an augur as described below with respect to FIGS. 4A-4B. The pneumatic conveyor system includes one or more fans 37A, 37B, a conduit for air 45, 49, 53, and a meter such as a volumetric meter 14A, 14B, 14C. Each volumetric meter 14A, 14B, 14C (e.g., one volumetric meter 14A, 14B, 14C associated with each of the three containers or storage tanks 18A, 18B, 18C, respectively) is configured to receive and meter the seeds or agricultural particles from the storage tanks 18A, 18B, 18C. The storage tanks 18A, 18B, 18C may be in the form of a tank, hopper, air cart, mobile seed storage device, or other bulk container as previously described and illustrated in FIG. 1. The volumetric meters 14A, 14B, 14C or other mechanical conveyer system control the amount or volume of seeds or other agricultural particles permitted to exit the lower end of the storage tanks 18A, 18B, 18C over a set period of time and may each include multiple roller segments or rotating members 20, each capable of rotating at a constant rotational velocity along a common shaft. The volumetric meters 14A, 14B, 14C are located upstream of and are operable to provide a known, constant volume of seeds or particles to the conduits 45, 49, 53. Gates 16 associated with each volumetric meter 14A, 14B, 14C or each roller segment 20 are operable to open or close to vary the amount of seeds or agricultural particles which reach the conduits 45, 49, 53. Alternatively, each roller segment 20 of the volumetric meters 14A, 14B, 14C may be individually driven, and therefore may be individually halted to vary the amount of seeds or agricultural particles which reach the conduits 45, 49, 53.

A fan 37A, 37B is located at one end of the conduits 45, 49, 53 and is operable to provide an air current to the corresponding conduits 45, 49, 53 and throughout the remainder of the metering system 10. As shown, the first conduit 45 utilizes a first fan 37A and the second and third conduits 49, 53 utilize a second fan 37B. Alternatively, a single fan may provide three air currents; one to each of the conduits 45, 49, 53, or individual fans may be associated with the respective conduits 45, 49, 53.

The main conduits 45, 49 terminate at distribution or dispersion units 40A, 40B, which are located between the volumetric meter 14A, 14B and the ground, where the seeds or particles are deposited. The dispersion units 40A, 40B as shown each have an inlet 30 coupled to the respective main conduit 45, 49, a collection volume, and a plurality of outlets 32, which lead to secondary conduits 36A, 36B. Each secondary conduit 36A, 36B leads to an outlet conduit 46A, 46B. As the seeds or agricultural particles from a single conduit (i.e., the conduit 45, 49) are dispersed among multiple conduits (i.e., the secondary conduits 36A, 36B), the secondary conduits 36A, 36B may be of lesser size or area than the associated conduits 45, 49.

The third distribution or dispersion unit 42 is enlarged in FIG. 3A and is dissimilar in design and operation to the dispersion units 40A, 40B. The function of the dispersion unit 42 is to keep the mini-hoppers 38 supplied with seed for singulation without overfilling the mini-hoppers 38. The dispersion unit 42 also serves to divide the single stream of product in the conduit 53 into multiple second conduits 36C for supply to multiple meters 22. The dispersion unit 42 includes sidewalls 51 including an upstream sidewall 42A and a downstream sidewall 42B, and further includes a bottom wall 42C. Dispersion unit 42 includes a container defining a hopper or central chamber 44 with an inlet 48 located at or near an upper end and connected to the main conduit 53. The inlet 48 accepts seeds from the volumetric meter 14C and air from the fan 37B. The lower portion 54 of the dispersion unit 42 is generally sloped or similarly oriented to direct the seeds within the central chamber 44 by gravity towards a nozzle assembly 56 located at the lowermost portion of the base 54.

Two sensors, an upper level or limit sensor 44A and a lower level or limit sensor 44B are located within the central chamber 44. The lower limit sensor 44B is located nearer the base than the upper limit sensor 44A. The sensors are configured to communicate an aspect of the seed level, such as the relative quantity of seed within the container or chamber 44, to a control unit (not shown). The sensors 44A, 44B may be mechanical or electrical/electronic in nature and based on, for example, pressure, optics, ultrasound, etc. The control unit uses the signals from the sensors 44A, 44B to control gates 16 at the outlet of the meter 14C to start and stop seed flow from the tank 18C to maintain a desired level of seed in the chamber 44.

The third dispersion unit 42 additionally includes an air outlet 62 in communication with the central chamber 44 and located at a height above the inlet 48 such that seeds do not block the air outlet 62. The air outlet 62 directs air from the central chamber 44 to an inlet 66 of the nozzle assembly 56. The nozzle assembly 56 includes an entrainment zone 60A at the bottom of the dispersion unit 42. Opposite the inlet 66, an outlet 68 is provided coupled to the secondary conduits 36C. A bridge 52 is placed over the inlet 66 and outlet 68 and bridges therebetween to force product in the chamber 44 to flow around the bridge to the entrainment zone 60A. As air flows in the inlet 66 into the entrainment zone 60A, seed is picked-up into the air stream and air entrained seed flows out the outlet 68 to the secondary conduit 36C. As shown in FIG. 3B, the third dispersion unit 42 may have a substantial depth (i.e., extending into the page of FIG. 3A) such that the unit 42 includes multiple inlets 66, entrainment zones 60A and outlets 68 spaced apart from one another along the base 54.

As mentioned above, the dispersion unit 42 may include multiple nozzle assemblies 56, each corresponding to a different inlet 66 and outlet 68. Therefore, multiple secondary conduits 36C, each associated with one of the outlets 68, may extend from the dispersion unit 42. As shown, air from the chamber outlet 62 is directed to the inlets 66. As an alternative, one or more additional fans may be provided to supply additional air flow. In this case, the air from the outlet 62 may be vented to the atmosphere.

Referring again to FIG. 2, the mini-hopper 38 selectively receives seeds from the third dispersion unit 42 via the secondary conduit 36C. The mini-hopper 38 is located directly upstream of a singulating meter 22 and feeds the seeds from the secondary conduit 36C into the meter 22. The mini-hopper 38 is additionally capable of storing a supply of seeds, to be metered by the singulating meter 22. This ensures that the singulating meter 22 is consistently stocked with seeds for singulating and subsequently planting. The mini-hopper 38 may be gravity-assisted, with an inlet 34A from the secondary conduit 36C located at a height above the outlet 34B to the singulating meter 22.

At the height of the inlet 34A or at a height between the inlet 34A and the outlet 34B, the mini-hopper 38 is provided with one or more openings 70. The openings 70 are sized smaller than the seeds such that seeds are not capable of traversing the openings 70. When not blocked by seeds, the openings 70 serve as an outlet for the air through the conduit 36C. When the mini-hopper 38 is sufficiently full to cover the openings 70, air flow is blocked in the conduit 36C such that seed is no longer picked-up into the air stream in the entrainment zone 60A. When seed is consumed from the mini-hopper by the meter 22 to lower the level of seed in the mini-hopper 38 and expose the openings 70 again, air will begin to flow through the conduit 36 and deliver more seed to the mini-hopper 38. Thus, the dispersion unit 42 is referred to as a "product on demand pick-up assembly." The dispersion unit 42 maintains a sufficient supply of seed in the mini-hopper 38 while the level sensors 44A, 44B in the dispersion unit and the gates 16 at the meter 14C maintain an adequate level of seed in the dispersion unit 42.

The singulating meter 22 is operable to singulate or individually meter seeds and is in communication with the mini-hopper 38 via the mini-hopper outlet 34B. The singulating meter 22 may include a rotating singulating disk (not shown) with multiple orifices, each sized to accept a single seed, and a doubles eliminator (not shown) provided to ensure a one-to-one ratio of seed to each aperture.

At an outlet end, the singulating meter 22 is connected to the conduit 46B. A seed sensor 50 is positioned within a conduit downstream of the singulating meter 22 outlet as shown in FIG. 2. The seed sensor 50 measures the number of seeds or rate of seeding (i.e., number of seeds per time increment) from the singulating meter 22. This information can be stored and relayed from a control unit to an operator for quality assurance and recorded for later analysis. The conduit 46B provides a path for the singulated seeds to reach the ground and may be in the form of a tube, hollow shaft, channel, belt, or similar means of conveyance suitable to transfer seed, fertilizer, or other agricultural particles to the ground. More specifically, the conduit 46B may deposit or plant the seeds in a furrow created by one of the ground openers 29B (FIG. 1), such as a seed shank. In other constructions, the opener may include one or two opener disks. Seed from the meter 22 may be combined with fertilizer from the conduit 36B and deposited together in the soil.

A number of control valves 28A-28B are provided in the system 10. The control valves 28A-28B may be diverter valves or proportional valves and can vary in operation from a fully open position (i.e., providing no additional metering) to a fully closed position (i.e., allowing no seeds to pass) and may be held at various amounts between fully open and fully closed. Alternatively, one or more of the control valves 28A-28B may switch only between the fully open position and the fully closed position with no intermediate positions. When in other than a fully closed position, the control valves 28A-28B allow passage for at least some of the air and/or seeds. As shown, FIG. 2 is a schematic and the system 10 need not include all valves 28A-28B.

The second and third conduits 49, 53 share a common origin at the second fan 37B. Therefore, a Y-joint or branch 72 separates the airflow from the fan 37B between each line 49, 53. The air control valve 28A is operably located at the branch 72 upstream of the outlets of the volumetric meters 14B, 14C. The valve 28A is operable to direct an amount or percentage of the total amount of air produced by the fan 37B towards the lines 49, 53.

From the seed storage tank 18C, the seeds may be dispersed via the second or the third dispersion unit 40B, 42. The dispersion valve 28B is operable to change the path taken by the seeds between the second and third conduits 49, 53. When in a first position, the dispersion valve 28B provides a path which connects the third volumetric meter 14C to the second conduit 49, allowing the seeds to mix with the fertilizer in the second conduit 49 upstream of the second dispersion unit 40B. Alternatively, if seed only is to be planted, then tank 18B is not used, resulting in seed only flowing through the dispersion unit 40B and conduits 36B. When in a second position, the dispersion valve 28B provides a path from the third volumetric meter 14C to the third dispersion unit 42 through the third conduit 53. The dispersion valve 28B may be embodied as a switching valve configured to open one path while simultaneously closing the other.

Referring to FIG. 2, the first storage tank 18A holds fertilizer. In operation, when actuated, the first volumetric meter 14A rotates to allow a known, but variable rate of fertilizer to exit the tank 18A and deposits the fertilizer in the conduit 45. The fertilizer enters the first conduit 45 which is concurrently supplied with airflow from the first fan 37A. The airflow carries the fertilizer within the first conduit 45 to the first dispersion unit 40A, which disperses the fertilizer amongst multiple secondary conduits 36A. Each secondary conduit 36A carries the fertilizer to the conduit 46A and deposits the fertilizer in a furrow created by the ground opener 29A such as a fertilizer shank (FIG. 1).

The second storage tank 18B also holds fertilizer. In operation, when actuated, the second volumetric meter 14B rotates to allow a known rate of fertilizer to exit the tank 18B at a known rate which may be varied. The fertilizer enters the second conduit 49, which is concurrently supplied with airflow from the second fan 37B. The airflow carries the fertilizer within the second conduit 49 to the second dispersion unit 40B, which disperses the fertilizer amongst multiple secondary conduits 36B. Each secondary conduit 36B carries the fertilizer to the conduit 46B and deposits the fertilizer in a furrow created by the seed shank 29B, separate from the fertilizer in the furrow created by the fertilizer shank 29A. For example, the fertilizer from the first tank 18A may be deposited between two adjacent seed furrows.

The third storage tank 18C holds seeds. When the third volumetric meter 14C is actuated, it rotates to allow a known amount of seeds to exit the tank 18C at a known rate. The valve 28B directs the seed in one mode to conduit 49 supplied with airflow from the second fan 37B where the seed mixes with fertilizer from tank 18B and is then conveyed pneumatically to the seed shank 29B as described above. In a second mode, the valve 28B directs seed into the third conduit 53 which is concurrently supplied with airflow from the second fan 37B. The airflow carries the seeds within the third conduit 53 to the third dispersion unit 42. The seeds enter the inlet 48 of the third dispersion unit where they pool in the central chamber 44 above the nozzle assemblies 56. Concurrently, the air that previously carried the seeds through the inlet 48 continues through the air outlet 62 and to the inlet 66 to pick-up and carry the seeds through the outlet 68 to the secondary conduit 36C in a controlled manner. Alternatively, a separate air source can be provided to the inlets 66.

The volumetric meter 14C and associated gate 16 permit seeds into the main conduit 53 and the central chamber 44 of the third dispersion unit 42 at a rate greater than the seeds exit the seed chamber 60. Therefore, seeds may accumulate within the central chamber 44. When the seeds accumulate to a level measured by the upper limit sensor 44A, the sensor relays a signal to the control unit (not shown) which in response actuates the associated gate 16 into a closed position, thereby stopping flow of the seeds into main conduit 53. As the seeds continue to pass through the nozzle assemblies 56 leading to the secondary conduits 36C, the level of seeds within the central chamber 44 decreases until the lower limit sensor 44B relays a signal that the number of seeds within the central chamber is at or below a lower limit. The signal is relayed to the control unit which actuates the gate 16 into an open position, thereby resuming the flow of the seeds from the third storage tank 18C. The seed from the secondary conduit 36C may be singulated via the singulating meter 22 before passing the seed sensor 50 and being deposited into the ground.

When the mini-hopper 38 reaches the maximum fill height, the openings 70 within the mini-hopper 38 are blocked by the seeds. In turn, the air within the associated secondary conduit 36C is unable to vent through the openings 70, thereby increasing the air pressure within the secondary conduit 36C and preventing further passage of seeds into the mini-hopper 38. When the seed level within the mini-hopper 38 drops below the maximum fill height, the openings 70 clear, permitting the free passage of air through the openings 70 and further carrying of additional seeds to the mini-hopper 38.

In another embodiment, the dispersion unit 42, as shown in FIGS. 2-3B may also be utilized as a seed storage tank for seeds that require a low seed rate, such as canola seeds. In such an embodiment, the dispersion unit 42 is directly filled with the seeds. Due to the low seeding rate, an operator is able to seed without necessitating refilling of the unit 42 prior to refilling the fertilizer tanks. The seeds within the dispersion unit are moved via air from the fan 37B into the secondary conduit 36C where they are singulated, as described above. Moving the storage of seed from the tank 18C to the dispersion unit 42 provides the tank 18C for other use. For example, the tank 18C may be filled with additional fertilizer and the fertilizer directed from the tank 18C to the main conduit 49 via the dispersion valve 28B.

Figure 4A:
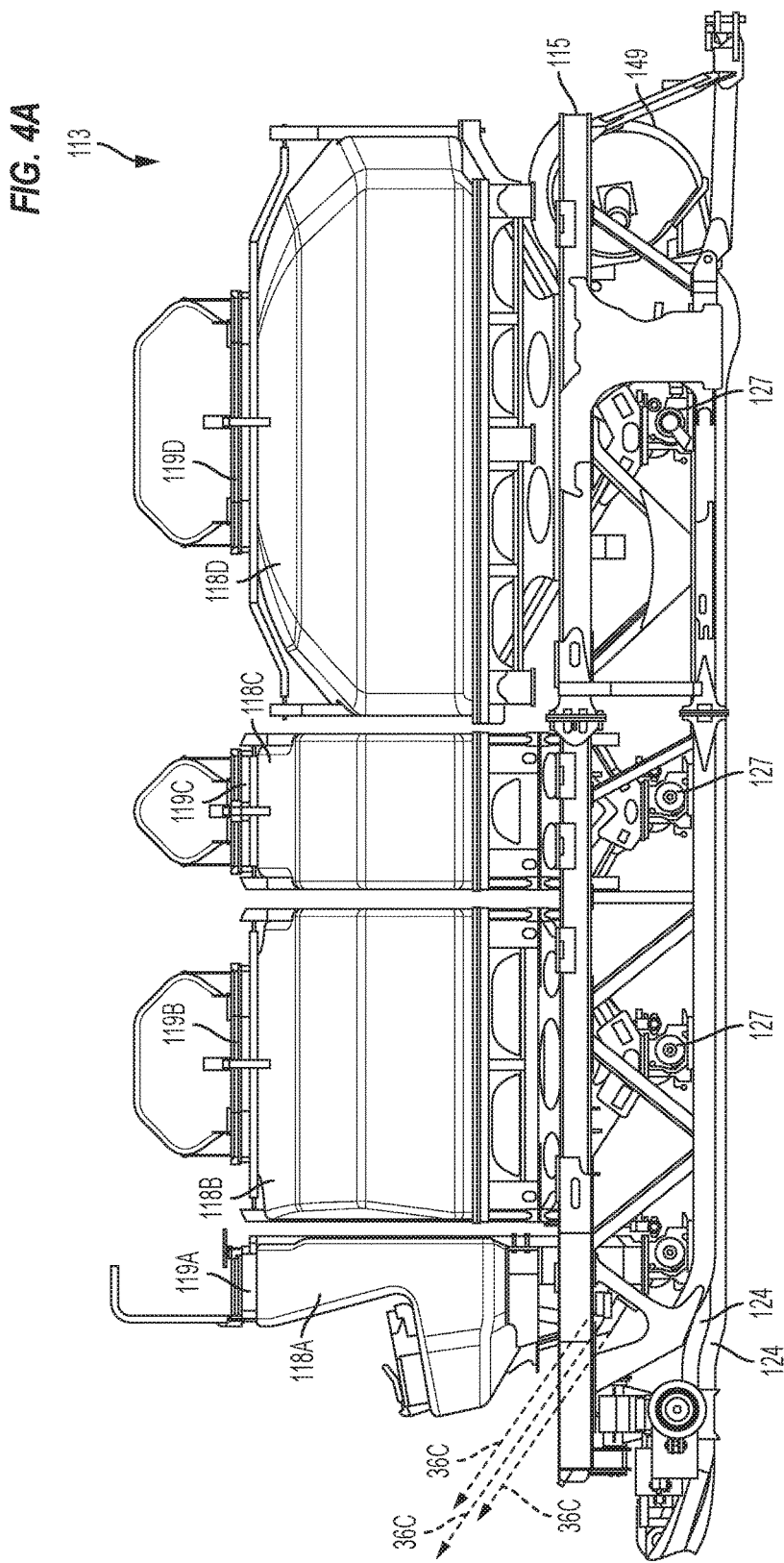
FIG. 4A is a side view of a seed cart including a plurality of tanks.

An alternative seed cart 113 is shown in FIG. 4A. The seed cart 113 includes four storage tanks 118A, 118B, 118C, 118D of varying sizes, the tanks 118A-D supported on a frame 115 although the tanks 118A-D need not all be carried on the same frame. Each tank 118A-118D narrows at the base to form a channel extending in a widthwise direction (i.e., into the page of FIG. 4A). The tanks 118A-D each have removable covers 119A-D, respectively, located on upper surfaces of the tanks 118A-D. The covers 119A-D are removable such that the tanks 118A-D can be filled with seed, fertilizer, or other agricultural particles. Tanks 118B, 118C, 118D are provided at their lower ends with volumetric meters 127 like the meters 14A-C in FIG. 2. The meters deliver product into manifolds, not shown, that direct product into one of upper and bottom rank portions 124 of primary conduits, similar to conduits 24 of FIG. 1. The product is directed to dispersion units like dispersion units 40A, 40B of FIG. 2 or distribution towers like tower 31 of FIG. 1. There the product is further divided and delivered to openers as described above.

Tank 118A, on the other hand, is a dispersion unit 142, similar in construction as the dispersion unit 42. An air supply system is not shown but is similar to that shown in FIG. 2. Air entrained seed exits the tank 118A in conduits 36C and is directed to singulating meters 22 as in FIG. 2. As described above with seeds applied at a low rate, the tank 118A is directly filled with seed through the upper cover 119A. Seed is supplied to the singulating meters 22 for deposit in the ground while fertilizer or other chemicals from the tanks 118B-D are also deposited in the ground.

With reference to FIG. 4B, the volumetric meter 127 of tank 118D is shown in greater detail. The meter 127 has a housing 160 with an upper inlet 161 for receiving product from the tank 118D. A removable meter cartridge 162 has eight meter segments 164, each directing product into one of the eight upper or lower rank portion primary conduits 124. In operation, the meter 127 of tank 118D is used for fertilizer while the tank 118A is directly filled with seed used in a low rate such that both tanks 118A and 118D are emptied at approximately the same time and can be refilled in a single stop of the machine. Seed from the tank 118A is singulated.

Alternatively, when a high rate seed is being distributed, such as wheat, seed is placed in the larger tank 118D. From there, the seed is supplied to the tank 118A for dispersion to the singulating meters 22. In this manner, the tank 118D is functioning like the tank 18C of FIG. 2 to supply seed to the dispersion unit 42, now tank 118A. To do this, the cartridge 162 of the meter 127 is removed and replaced by an auger cartridge 130, as shown in FIG. 4C. The auger cartridge 130 fits into the metering housing 160 and has a housing 131 with an opening 132 that receives product from the tank 118D. A helical or screw auger within the housing rotates to deliver product to the outlet pipe 143. The auger is driven by a motor, not shown, which is operable at variable speeds to vary the rate at which product is discharged. Alternatively, the auger can be operated at a fixed speed and started and stopped periodically to vary the product discharge rate. From the auger outlet pipe 143, the product is delivered into a pipe 145 supplied with an air stream from a fan 149 (FIG. 4A) for pneumatic conveyance to the tank 118A in a similar manner of operation as the tank 18C supplies seed to the dispersion unit 42 described above in connection with FIG. 2. Alternatively, a mechanical conveyor can be used to deliver the seed to the tank 118A in place of the pneumatic conveyor. A second helical auger or a belt conveyor can be used for this purpose.

In operation, the seed in the tank 118A is dispersed through individual conduits 36A to singulating meters 22. Because the seed is used at a high rate, the tank 118A needs to be frequently replenished with seed. This is done by the auger cartridge 130 supplying seed from the larger tank 118D as needed. Auger 130 can be operated continuously at a low rate to not over fill the tank 118A. Alternatively, the auger 130 can be started and stopped periodically. As with the dispersion unit 42, the tank 118A is provided with upper and lower level sensors to monitor the seed level in the tank and ensure the seed level remains within a desirable range. The cart 113 is thus useful in the singulation of both high rate seeds and low rate seeds.

Figure 5:
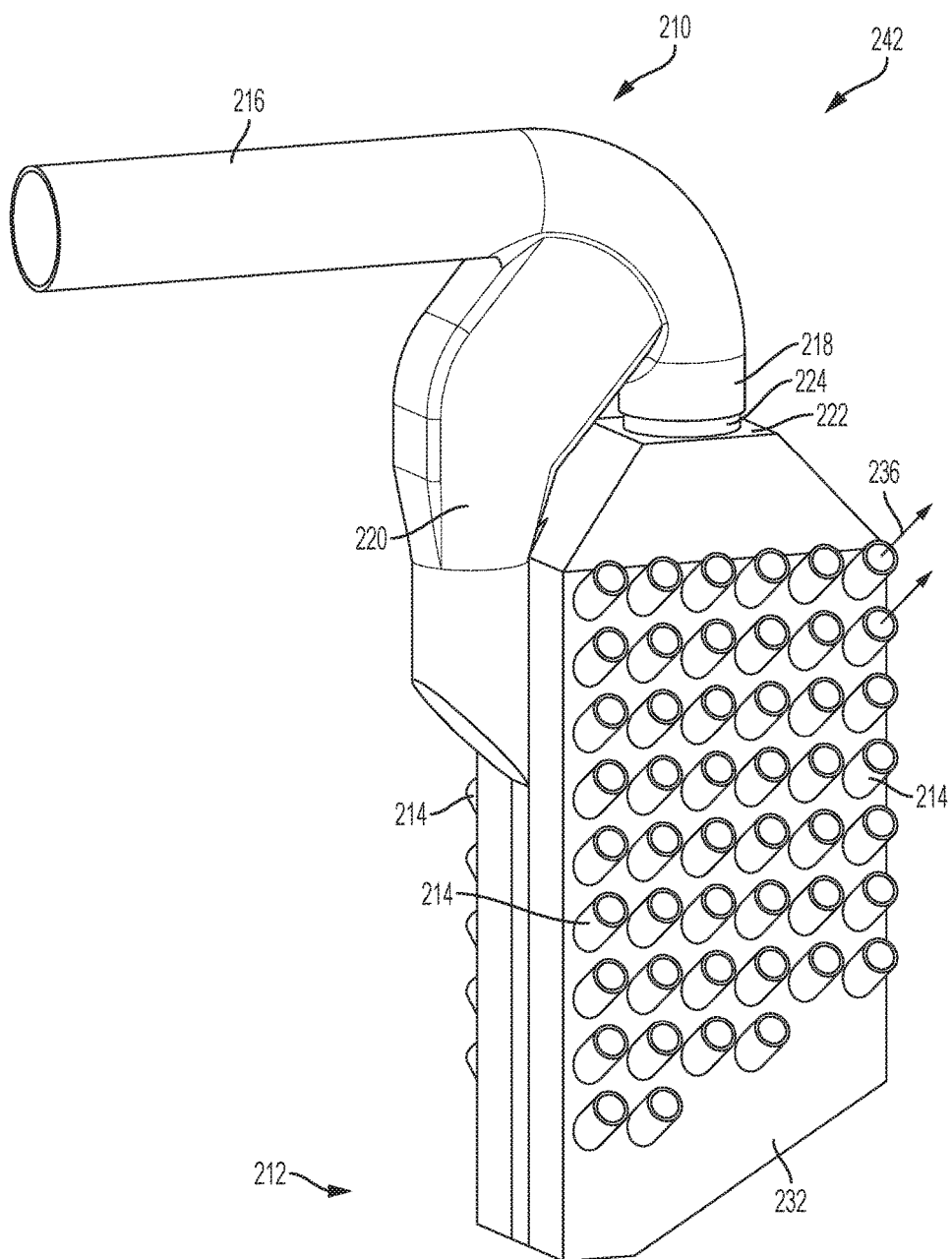
FIG. 5 is a perspective view of a distribution unit, according to one embodiment.
Figure 6A:
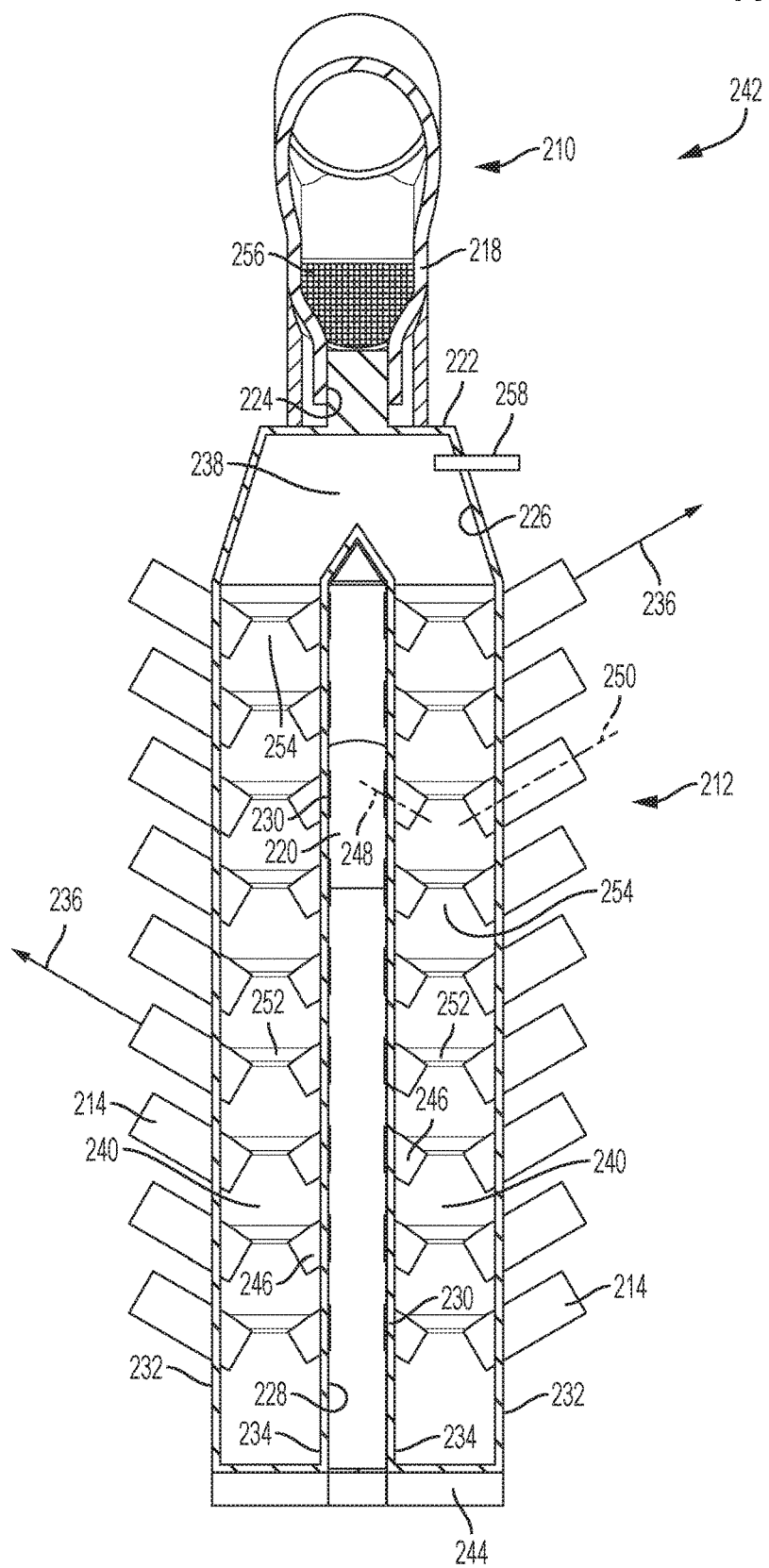
FIG. 6A is a cross-sectional side view of the distribution unit of FIG. 5.
Figure 6B:
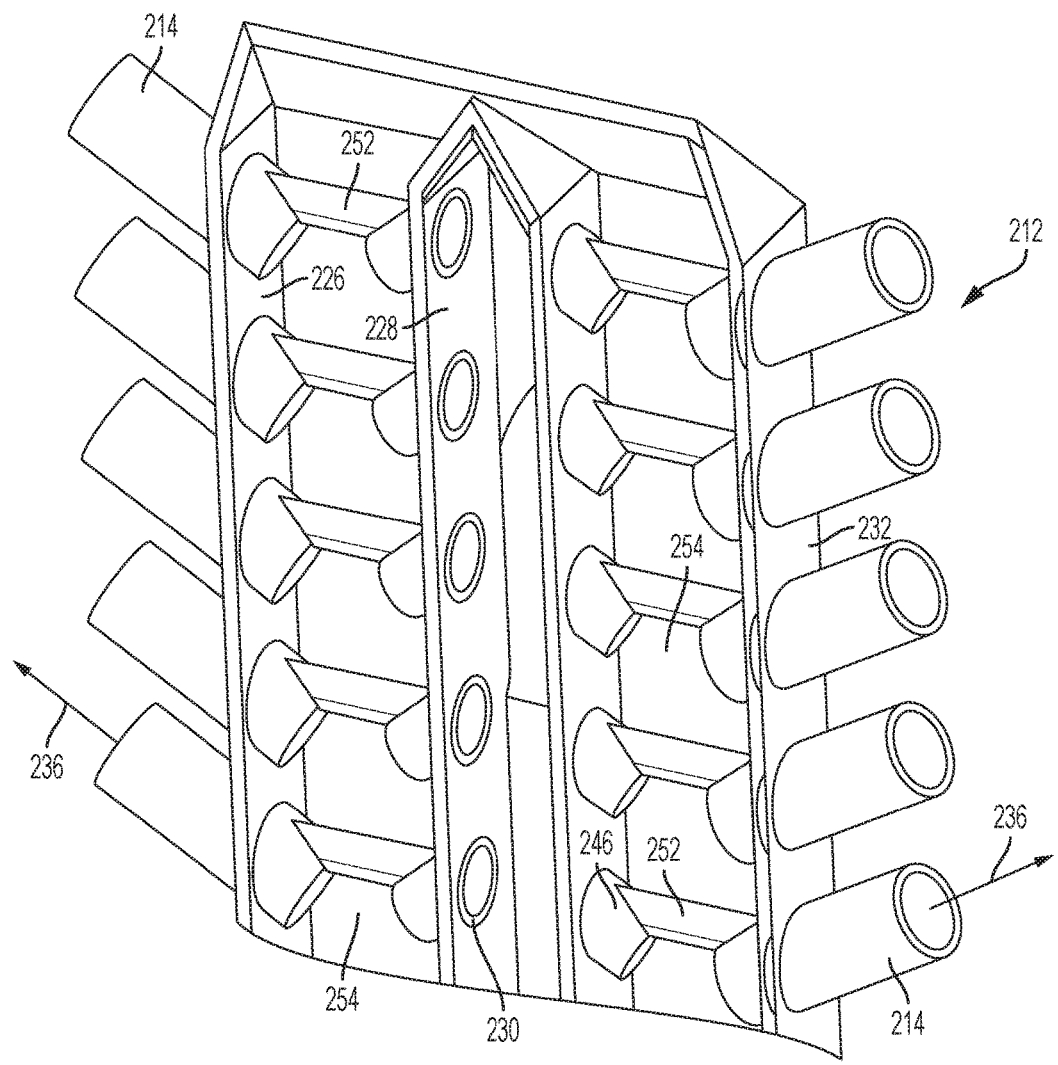
FIG. 6B is a partial perspective view of the internal chambers of the distribution unit of FIG. 5.

With reference to FIGS. 5-10, alternative dispersion units are shown that are operable with the auger cartridge 130. In one embodiment, as shown in FIGS. 5-6B, the dispersion unit 242 consists of an inlet portion 210, a body portion 212, and a plurality of outlets 214 extending from the body portion 212. The inlet portion 210 consists of a common inlet 216 extending from the main conduit 145, and separating into two distinct inlets, a seed inlet 218 for seeds and agricultural particles, and an air inlet 220. The seed inlet 218 extends from the common inlet 216 to an upper surface 222 of the body portion 212 and specifically to an opening 224 in the upper surface 222 of the body portion 212. The opening 224 connects the seed inlet 218 with a first chamber 226 of the body portion 212. The air inlet 220 branches from the remainder of the inlet portion 210 at a location between the common inlet 216 and the seed inlet 218. The air inlet 220 connects to the body portion 212 such that the air inlet 220 is operable to provide air to a second chamber 228 of the body portion 212, distinct from the first chamber 226 of the body portion 212. A separator or screen 256 is provided across the branched end of the air inlet 220 to obstruct the entrance of seeds and agricultural particles from the air inlet 220 without inhibiting airflow therethrough. Alternatively, conveyance air may be provided to the second chamber 228 via a separate clean air line.

As shown in FIGS. 6A-6B, the body portion 212 includes the first and second chambers 226, 228 described above, and further includes apertures 230 that connect the first chamber 226 to the second chamber 228. The first chamber 226, or the seed chamber, communicates with the seed inlet 218 via the opening 224 in the upper surface 222 and is defined by external walls 232 and internal walls 234 that collectively form an inverted-U shape (i.e., a peak 238 with two legs 240 branching off towards a base 244). The seed inlet 218 is located at the peak 238 such that seeds from the seed inlet 218 are able to filter down from the peak 238 into either of the two legs 240. The second channel 228, or air plenum, is located between the two legs 240, below the peak 238, and is at least partially defined by the internal walls 234. The inner walls 234 are provided with the apertures 230 to fluidly connect the first chamber 226 to the second chamber 228. For example, the inner walls 234 are provided with ninety-six apertures 230, each aperture 230 corresponding to and aligned with one of the plurality of outlets 214 extending from the body portion 212. The apertures 230 in the inner wall are aligned with a corresponding outlet 214 such that the central axes 248, 250 of the aperture 230 and the corresponding outlet 214 are coplanar (e.g., in the cross-sectional plane shown in FIG. 6A). As shown, the apertures 230 include downward facing tubular portions 246 that extend from the apertures and project into the seed chamber 226 such that seeds within the seed chamber 226 do not fall into the air chamber 228.

The outlets 214 extend from the external walls 232 of the body portion 212 in an orthogonal array, though the outlets 214 may be otherwise diagonally staggered, radially arrayed, or randomly located along the outer walls of the body portion 212. For example, the array shown in FIG. 5 includes seven rows of six outlets 214, followed by a row of four outlets 214, and a row of two outlets 214. Greater or fewer rows or columns may be otherwise used. This array is mirrored on the other side of the dispersion unit 242. A bridge member 252 corresponding to each aperture/outlet pair bridges the gap between (i.e., connects) the corresponding portion 246 and outlet 214 and extends above the pair to reduce the influence of the seeds located above an entrainment region 254 (i.e., directly between the aperture/outlet pair) on the air flow which moves the product to and through the outlet 214.

The ninety-six outlets 214 each feed a secondary conduit 236, which in turn leads to a mini-hopper 38 and singulating meter 22 similarly to the arrangement shown downstream of the dispersion unit 42 in FIG. 2 directing seed to mini-hopper 38. The dispersion unit 242 may be provided with more or fewer outlets 214 to correspond with the total number of desired secondary conduits 236, mini-hoppers 38, and singulating meters 22.

One or more fill sensors 258 may be located within the unit 242 to provide an indication of whether the unit 242 is full. For example, a signal may be sent to a control unit (not shown) if the unit is full, and in turn, the auger 131 may be slowed or stopped to limit or prevent additional product from entering the main conduit 145, the inlet portion 210, and the first chamber 226 of the unit 242. Alternatively, unit 242 may be supplied with seed from tank 18C via meter 14C as shown in FIG. 2, the unit 242 being used in place of unit 42 of FIG. 2.

In operation, the tank 118D provides seeds to the dispersion unit 242 via the auger 139 and main conduit 145. The seeds, propelled by airflow from a fan (such as fan 37B) enter the common inlet 216 of the inlet portion 210 of the dispersion unit 242 and continue into the body portion 212 of the unit 242 via the seed inlet 218. The seeds gather within the seed chamber 226 of the body portion 212. The seeds bypass the air inlet 220, unable to pass through due to the screen 256 covering the passage. On the other hand, air is capable of passing through the screen 256, and continues to the body portion 212 of the unit 242 via the air inlet 220. The air enters into the air plenum 228 of the body portion 212. From here, the air passes through the apertures 230 that connect the air chamber 228 and seed chamber 226, moving the seeds within the seed chamber from the entrainment region 254 to and through an adjacent outlet 214. From each respective outlet 214, the seeds are directed to singulating meters, as discussed above with respect to the system 10 as shown downstream of the dispersion unit 42 in FIG. 2.

Figure 7:
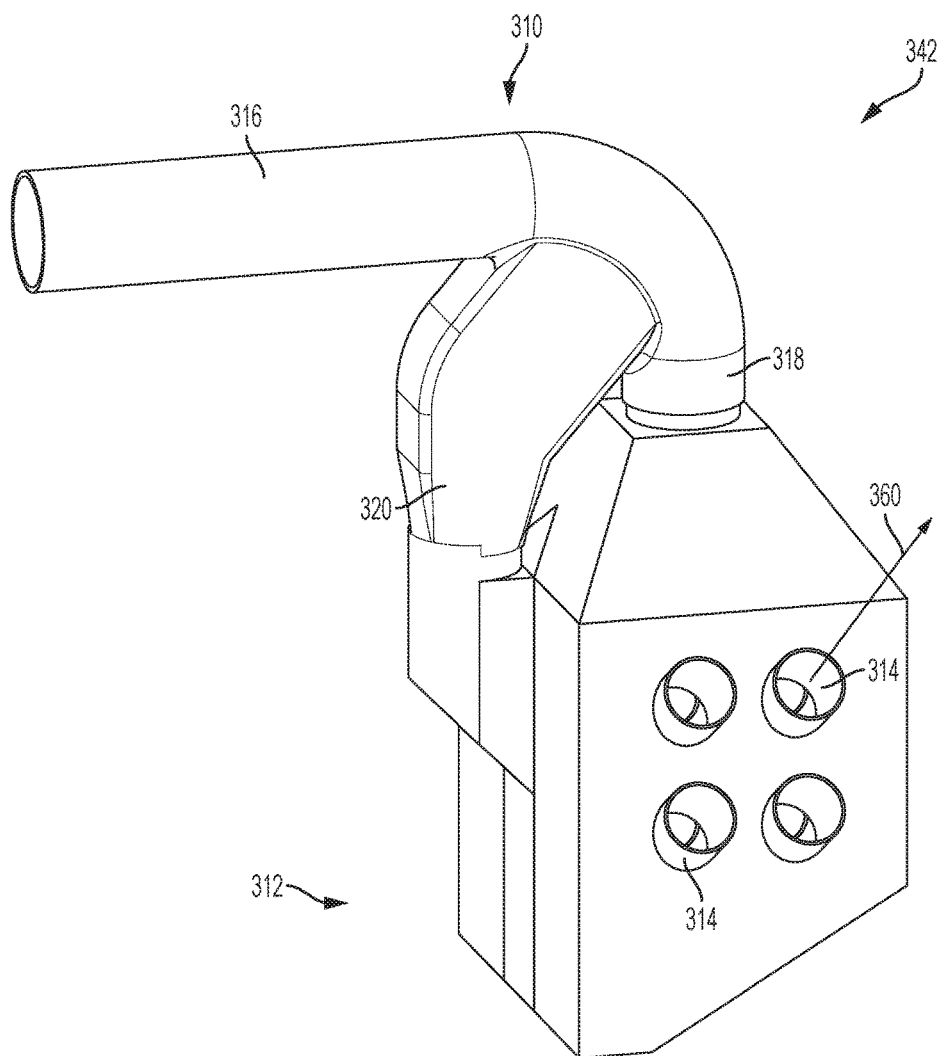
FIG. 7 is a perspective view of a distribution unit, according to one embodiment.

In another embodiment, as shown in FIGS. 7-8, the dispersion unit 342 consists of an inlet portion 310, a body portion 312, and a plurality of outlets 314 extending from the body portion 312. The dispersion unit 342 is similar to the dispersion unit 242, except as otherwise described. The body portion 312 of the dispersion unit 342 is smaller in size than that of the dispersion unit 242. The inner walls 334 are provided with fewer apertures 330, and the external walls 332 are provided with fewer corresponding outlets 314 than the dispersion unit 242 shown in FIGS. 5-6B. Further, the apertures 330 and outlets 314 have a larger diameter such that the volumetric flow rate of air through each aperture 330 is increased (relative to the apertures 230 shown in FIGS. 6A-6B) and the volume flow rate of air and entrained product through the outlets 314 is increased (relative to the outlets 214 shown in FIGS. 5-6B). As shown, the dispersion unit 342 includes eight outlets 314 (i.e., four on each side) in orthogonal or rectangular arrays, each outlet 330 aligned with one of the apertures 314. In contrast to the dispersion unit 242, which includes ninety-six outlets 214 configured to feed ninety-six secondary conduits 236, the dispersion unit 342 only includes eight outlets 314 configured to feed eight intermediate conduits 360. In order to further disperse the seeds or agricultural particles from the eight intermediate conduits 360 to the ninety-six singulating meters, each intermediate conduit 360 is provided with a secondary dispersion unit 362.

Figure 9A:
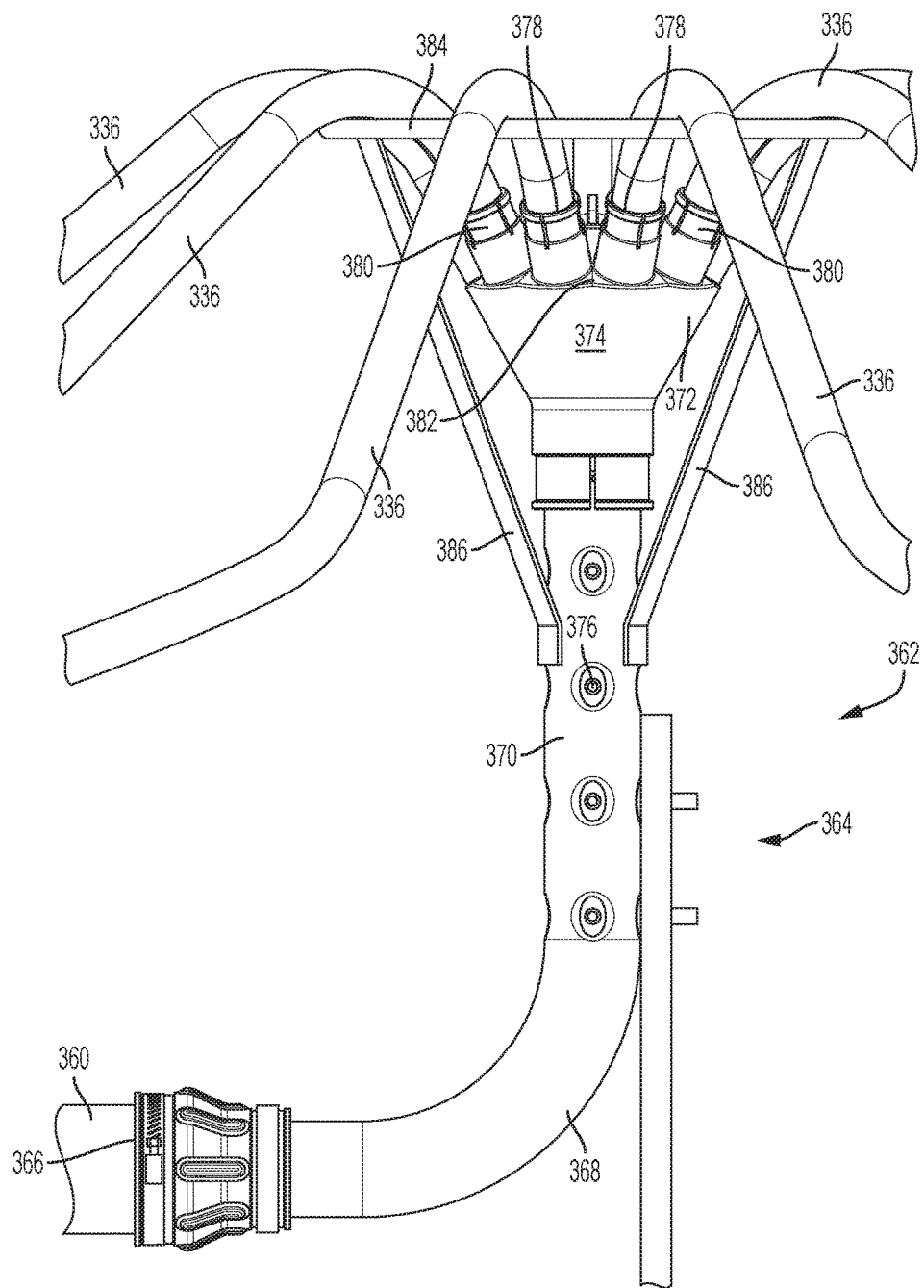
FIG. 9A is an outlet tower located downstream of the distribution unit of FIG. 7.

As shown in FIG. 9A, the secondary dispersion unit 362 includes a J-tube 364 with a single inlet 366 from the intermediate conduit 360, with twelve outlets 378, though the number of outlets may vary based on the total number of singulating meters and outlets 314 in the unit 342. The inlet 366 has a diameter sized similarly to the diameter of the mating intermediate conduit 360 and larger than the diameters of the secondary outlet conduits 336. Each of the twelve outlets conduits 336 leads to a mini-hopper 38 and singulating meter 22, similarly to the arrangement shown downstream of the dispersion unit 42 in FIG. 2.

The J-tube 364 is formed with an inlet 366 located at a lowermost point, a curve or elbow 368, and a tube portion 370, which leads to a base 372. The base 372 defines a central dispersion point 374. The J-tube 364 includes a number of dimples 376 impressed into the tube portion 370. The dimples 376 are operable to tumble the seeds in various directions, thereby randomizing the flow of seeds to the central dispersion point 374. The central dispersion point 374 extends from the tube portion 370 with an increasing diameter such that each of twelve outlets 378 is spaced about an upper periphery 382 of the base 372. The base 372 includes couplings 380 for receiving the secondary conduits 336, the couplings 380 extending from the upper periphery 382 of the base 372. Though shown at approximately fifteen degrees relative to an axis of the tube portion 370), the couplings 380 may be positioned from 0 degrees to 15 degrees relative to the axis .

Figure 9B:
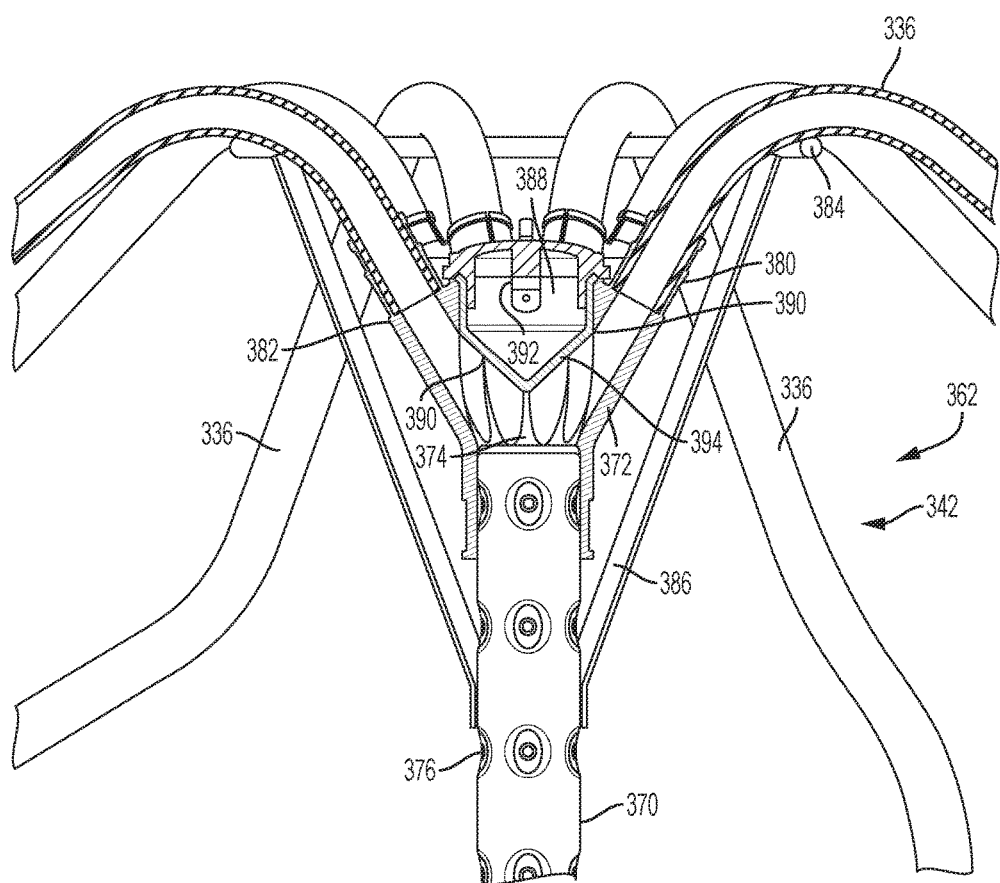
FIG. 9B is a cross-sectional view of the outlet tower of FIG. 9A.
Figure 10:
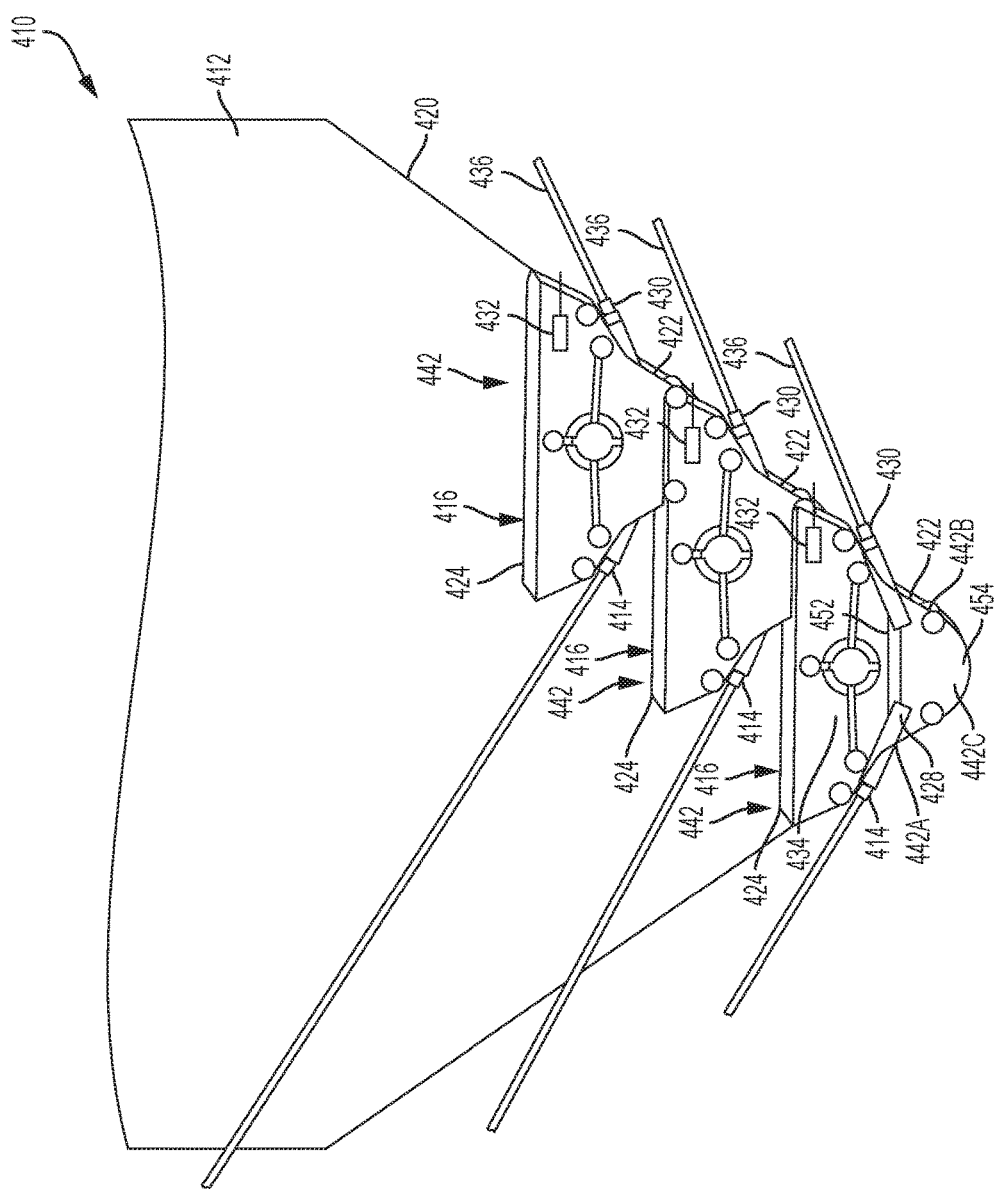
FIG. 10 is a schematic side view of a distribution unit, according to one embodiment.

As shown in FIG. 9B, the base 372 may include a chamber 388 in fluid communication with the inlet 366 (FIG. 9A) and outlets 336 via one or more apertures 390. The apertures 390 are sized to prevent seeds from entering the chamber 388, yet allow the chamber 388 to pressurize with the remainder of the base 372. A pressure sensor 392 may be located within the chamber 388 or elsewhere within the base 372 of the J-tube 364 to determine how many downstream meters (e.g., such as singulating meters 22) are demanding seed. A lower wall 394 of the chamber 388 is conical and is therefore operable to direct seeds towards the periphery of the base 372 and towards the outlets 378.

An annular frame 384 is provided to support the secondary conduits 336 adjacent the couplings 380. The annular frame 384 is attached to the vertical portion 370 of the J-tube 364 via support brackets 386. When assembled, the secondary conduits 336 drape over the top of the annular frame 384. This limits the stress on the couplings 380 and increases the vertical height of the secondary conduits 336. The annular frame 384 may be adjustable to vary the vertical height of the secondary conduits 336, or may otherwise be fixed (e.g., fastened) at a set height.

In operation, the tank 118D provides seeds to the dispersion unit 342 via the auger 139 and main conduit 145. The seeds, propelled by airflow from a fan (such as fan 37B) enter the common inlet 316 of the inlet portion of the dispersion unit 342 and continue into the body portion 312 of the unit 342 via the seed inlet 318. The seeds gather within the seed chamber 326 of the body portion 312. The airflow continues to the body portion 312 of the unit 342 via the air inlet 320. The air enters into the air chamber 328 of the body portion 312. From here, the air passes through the apertures 330 that connect the air chamber 328 and seed chamber 326, moving the seeds within the entrainment region 354 of the seed chamber 326 to and through an adjacent outlet 314. From each respective outlet 314, the seeds continue to the respective intermediate conduits 360 and secondary dispersion units 362. At each secondary dispersion unit 362, the seeds enter the J-tube 364 at the inlet 366, and continue through the bend 368 and into the tube portion 370 of the tube 364. Here, the dimples 376 disrupt the flow of the seeds such that they enter the central dispersion point 374 in various directions. The seeds are propelled by the airflow into one of the secondary conduits 336 via the outlets 378 located about the upper periphery 382 of the base 372. Increasing the height of the secondary conduits 336 by draping them over the annular frame 384 increases the air pressure/flow threshold required to move seeds into the secondary conduits 336. Once within the secondary conduits 336, the seeds are further metered (e.g., singulated), as discussed above with respect to the system 10 downstream of the dispersion unit 42, as shown in FIG. 2. When one of the secondary conduits 336 requires no additional seeds (i.e., the downstream mini-hopper 38 is full), airflow through the conduit 336 will be restricted, preventing further seeds from passing therethrough. The combination of the restricted air flow and the upward orientation of the couplings 380 and secondary conduits 336 prevents further seed flow though the secondary conduits to the singulating meters. Once seed from the mini-hopper has been consumed and the air outlet of the mini-hopper is no longer covered, air flow will begin again through the secondary conduit 336 carrying seed once again to the mini-hopper. Further, the pressure sensor recognizes the change in pressure and may provide a reading to a control unit (not shown) that corresponds with a decrease in the flow of seeds from the auger 139 and tank 118D. The control unit may in turn relay such a change to the motor driving the auger 139, thereby modifying the rotational velocity of the auger 139.

In yet another embodiment, a tank assembly 410 consists of a tank 412 and a plurality of dispersion units 442 each similar to a dispersion units 42, except as described below with respect to air and product inlets 414, 416. The tank 412 is a trough that narrows at a base 418 and is located around the plurality of dispersion units 442. One or more of the walls 420 of the trough may be integral with or attached to walls 422 of the dispersion units 442. As shown, the dispersion units 442 are staggered relative to one another along one of the walls 420, with the lowermost dispersion unit 442 centered at the base 418 of the trough.

In contrast to the dispersion units 42, which include a product and air inlet located along a sidewall of the unit and connected to a main conduit, the upper end 424 of the dispersion units 442 is open to the tank as a fill opening and product inlet 416. Therefore, when the tank 412 is filled with seeds or other agricultural particles, hoppers 434 of the dispersion units 442 are likewise filled. As product leaves the dispersion units 442, additional product within the tank 412 refills the units 442.

Each dispersion unit 442 includes one or more air inlets 414 provided directly to each unit 442. The air inlets 414 provide air to entrainment region 454 as described above with respect to FIG. 3A.

Referring back to FIG. 10, each dispersion unit 442 is provided with multiple outlets 430 (i.e., extending into the page; aligned with one another in the cross-section shown), each opposite an inlet 414, for the air and entrained product from the entrainment region 454. The air inlets 414 may begin as a single channel at a fan or alternative air source, and branch into the individual inlets 414. With three dispersion units 442 each having thirty-two inlets 414 and outlets 430, the tank assembly 410 includes ninety-six total outlets 430, each outlet 430 feeding a secondary conduit 436, which in turn leads to a mini-hopper 38 and singulating meter 22 as shown in FIG. 2. The dispersion units 442 may be provided with more or fewer outlets 430 to correspond with the total number of desired secondary conduits 436. Further, the tank 412 or the units 442 may be provided with sensors 432 to inform an operator when the units 442 are empty or running out of seeds.

Each dispersion unit 442 includes an upstream sidewall 442A, a downstream sidewall 442B, a bottom wall 442C, and an open upper end 424, with the upstream sidewall 442A including the plurality of air inlets 414 and the downstream sidewall 442B including the plurality of air and entrained product outlets 430. The apertures or openings (e.g., between adjacent bridges 452) connecting the hopper 434 and the seed channels or nozzle assemblies 428 extend into the page of FIG. 10 (i.e., one aperture and one seed channel 428 per outlet 430) such that the tank assembly 410 includes a plurality of seed channels 428 vertically stacked relative to one another and horizontally offset so that each open upper end 424 is exposed to receive product. Seed channel 428 is formed similarly to the nozzle assembly 56 shown in FIG. 3A.

In operation, a user fills the tank 412 with seed such that the seeds fill each of the dispersion units 442. The seeds fall into the seed channel 428 within each unit 442. Air flows from the air inlets 414 entrains the seeds from the seed channel 428, out the air and entrained product outlets 430, and to the secondary conduits 436. Once within the secondary conduits 436, the seeds are further metered (e.g., singulated), as discussed above with respect to the system 10 downstream of the dispersion unit 42, as shown in FIG. 2. Alternatively, the tank 412 may be replenished with seed from another tank on an ongoing basis as seed from the tank 412 is consumed.

Various features of the disclosure are set forth in the following claims.

What is claimed is:

1. A product distribution system comprising:
    a product on demand pick-up assembly including a hopper, the hopper configured such that an air stream flowing into the product on demand pick-up assembly entrains product therein and conveys product downstream through a plurality of conduits, the product on demand pick-up assembly further including a mini-hopper positioned downstream of the hopper and configured to receive a portion of the product;
    a singulating meter in communication with the mini-hopper via a mini-hopper outlet;
    a container for storing of product prior to delivery of product to the pick-up assembly; and
    a meter and conveyor assembly configured to move product from the container to the pick-up assembly hopper such that an amount of product greater than a predetermined quantity is maintained in the pick-up assembly hopper during operation of the system,
    wherein the pick-up assembly includes a plurality of nozzles, each nozzle of the plurality of nozzles defining an inlet for air, an outlet for air and entrained product, and an entrainment zone between the inlet and outlet, wherein product in the entrainment zone is entrained in an air stream passing from the inlet to the outlet.

2. The product distribution system of claim 1 wherein the pick-up assembly hopper has at least one fill opening for receiving product other than product from said container.

3. The product distribution system of claim 2 further comprising
    a level sensor in the pick-up assembly hopper.

4. The product distribution system of claim 1 wherein the meter and conveyor assembly includes a mechanical conveyer system having an inlet at a lower end of the container and an outlet at an upper end of the hopper.

5. The product distribution system of claim 4 wherein the mechanical conveyer system includes an auger within an auger tube, the auger tube having an inlet at a lower end of the container and an outlet at an upper end of the hopper wherein the rotational speed of the auger functions to meter product flow from the container to the hopper.

6. The product distribution system of claim 1 wherein the meter and conveyor assembly includes a pneumatic system including a fan, a conduit for air from the fan to the hopper, a meter mechanism to discharge product from the container into the conduit at a controlled rate and a separator to separate product from the air.

7. The product distribution system of claim 6 wherein air for entraining product in the pick-up assembly is at least in part supplied from the conduit delivering product to the pick-up assembly hopper.

8. The product distribution system of claim 1 wherein the pick-up assembly has at least one air inlet and a plurality of air and entrained product outlets.

9. The product distribution system of claim 1 wherein the pick-up assembly has a plurality of air inlets and an equal plurality of air and entrained product outlets.

10. The product distribution system of claim 1 wherein each inlet is coupled to an air supply tube.

11. The product distribution system of claim 1 wherein each inlet is open to an air plenum.

12. The product distribution system of claim 11 wherein the plurality of nozzles are arranged in a horizontal array.

13. A product distribution system comprising:
- a product on demand pick-up assembly including a hopper, the hopper configured such that an air stream flowing into the product on demand pick-up assembly entrains product therein and conveys product downstream through a plurality of conduits;
- a container for storing of product prior to delivery of product to the pick-up assembly; and
- a meter and conveyor assembly configured to move product from the container to the pick-up assembly hopper such that an amount of product greater than a predetermined quantity is maintained in the pick-up assembly hopper during operation of the system,
- wherein the pick-up assembly includes a plurality of nozzles each defining an inlet for air, an outlet for air and entrained product and an entrainment zone between the inlet and outlet where product in the entrainment zone is entrained in an air stream passing from the inlet to the outlet, and
- wherein the plurality of nozzles are arranged in both horizontal and vertical arrays.

14. A product distribution system comprising:
- a product on demand pick-up assembly including a hopper, the hopper configured such that an air stream flowing into the product on demand pick-up assembly entrains product therein and conveys product downstream through a plurality of conduits, the product on demand pick-up assembly further including a mini-hopper positioned downstream of the hopper and configured to receive a portion of the product;
- a singulating meter in communication with the mini-hopper via a mini-hopper outlet;
- a container for storing of product prior to delivery of product to the pick-up assembly; and
- a meter and conveyor assembly configured to move product from the container to the pick-up assembly hopper such that an amount of product greater than a predetermined quantity is maintained in the pick-up assembly hopper during operation of the system,
- wherein the pick-up assembly includes a nozzle assembly having an upstream sidewall, a downstream sidewall, a bottom wall and open upper end, the upstream sidewall having a plurality of air inlets and the downstream sidewall having a plurality of air and entrained product outlets with an outlet opposite each inlet whereby air flowing through each inlet passes over the bottom wall to pick-up product and then carries the entrained product through a respective air and entrained product outlet.

15. The product distribution system of claim 14 wherein the pick-up assembly includes a plurality of said nozzle assemblies vertically stacked relative to one another and horizontally offset so that each open upper end is exposed to receive product.

* * * * *